United States Patent

Gleine et al.

[11] Patent Number: 5,875,998
[45] Date of Patent: Mar. 2, 1999

[54] METHOD AND APPARATUS FOR OPTIMIZING THE AERODYNAMIC EFFECT OF AN AIRFOIL

[75] Inventors: Wolfgang Gleine, Kakenstorf; Reinhard Hilbig, Delmenhorst; Hans-Joachim Wendt, Buxtehude, all of Germany

[73] Assignee: Daimler-Benz Aerospace Airbus GmbH, Hamburg, Germany

[21] Appl. No.: 994,725

[22] Filed: Dec. 19, 1997

Related U.S. Application Data

[62] Division of Ser. No. 596,653, Feb. 5, 1996, Pat. No. 5,740,991.

[51] Int. Cl.$^6$ .................................................. B64C 13/16
[52] U.S. Cl. ........................ 244/195; 244/203; 244/213; 244/219; 244/35 A; 701/3
[58] Field of Search ...................... 244/194, 195, 244/198, 203, 209, 213, 214, 215, 217, 219, 201, 130, 35 A; 359/144, 164, 173; 701/3, 14

[56] References Cited

U.S. PATENT DOCUMENTS

| | | | |
|---|---|---|---|
| 2,440,198 | 4/1948 | Green ................................... | 244/203 X |
| 4,161,300 | 7/1979 | Schwaerzler et al. . | |
| 4,235,104 | 11/1980 | Hoadley et al. . | |
| 4,422,180 | 12/1983 | Wendt .................................. | 244/194 X |
| 4,638,962 | 1/1987 | Gunter et al. ............................ | 244/203 |
| 4,664,345 | 5/1987 | Lurz . | |
| 4,674,717 | 6/1987 | Loebert . | |
| 4,722,499 | 2/1988 | Klug . | |
| 4,736,912 | 4/1988 | Loebert . | |
| 4,741,503 | 5/1988 | Anderson et al. ................... | 244/219 X |
| 4,836,473 | 6/1989 | Aulehla et al. ........................... | 244/130 |
| 4,899,284 | 2/1990 | Lewis et al. .......................... | 244/219 X |
| 4,932,611 | 6/1990 | Horikawa ................................ | 244/203 |
| 5,082,207 | 1/1992 | Tulinus ................................ | 244/203 X |
| 5,135,186 | 8/1992 | Ako . | |
| 5,323,256 | 6/1994 | Banks . | |
| 5,335,885 | 8/1994 | Bohning . | |
| 5,457,630 | 10/1995 | Palmer ................................. | 244/195 X |
| 5,737,222 | 4/1998 | Palmer ................................. | 244/203 X |

FOREIGN PATENT DOCUMENTS

| | | |
|---|---|---|
| 3114143 | 4/1989 | Germany . |
| 3903881 | 4/1990 | Germany . |

*Primary Examiner*—William Grant
*Attorney, Agent, or Firm*—W. F. Fasse; W. G. Fasse

[57] ABSTRACT

A method and an apparatus are provided for optimizing the aerodynamic effect of the airfoil of an aircraft by defined changes in camber. The method includes the following steps:

a. determining the flow for the flight condition caused by the change in camber,
b. comparing the ascertained characteristic values with stored nominal reference values for an optimal flow,
c. forming differential values between the characteristic values and the stored nominal reference values,
d. deriving actuator signals from the differential values, and
e. changing the camber by motor, based on the actuator signals, for minimizing the differential values.

The optimum wing flow is thereby maintained more exactly. For transonic wings, the position and strength of compression shocks is also effectively controlled, which leads to a reduction of the direct shock induced separation.

8 Claims, 9 Drawing Sheets

METHOD AND APPARATUS FOR OPTIMIZING THE AERODYNAMIC EFFECT OF AN AIRFOIL

CROSS REFERENCE TO RELATED APPLICATION

The present application is a Divisional Application of our commonly assigned application U.S. Ser. No.: 08/596,653, filed on: Feb. 5, 1996 now U.S. Pat. No. 5,740,991.

FIELD OF THE INVENTION

The invention relates to a method and an apparatus for optimizing the aerodynamic effect of the airfoil of a transport and commercial aircraft.

BACKGROUND INFORMATION

A method for optimizing the cruise flight aerodynamic conditions of aircraft with transonic airfoils and the relevant apparatus for performing this method are disclosed in German Patent Document 3,114,143 C2. The method disclosed therein serves to change the camber of the airfoil by ascertaining current or actual flight data during flight and determining a defined airfoil camber dependent on these data, whereby the actual flight data are the altitude, the flight speed, and the flight weight. The apparatus is formed by a flap system comprising a slat system as well as a trailing edge flap system of the airfoil, wherein the trailing edge flap system includes high lift flaps as well as spoilers, whereby the spoilers are respectively biased to lie tightly against the high lift flaps.

In a suitable aircraft, the known method extends the limits for the optimum cruising range or cruise flight condition, i.e. achieves a minimum fuel consumption or minimum flight time.

By the control measures provided within the context of the above method, the desired favorable aerodynamic configuration is maintained for a very much greater range of speed and angle of attack or lift than would be possible without such control measures. Furthermore, the trailing edge separation, the direct shock-induced separation, as well as the shock position at high Mach numbers can be controlled. The wing air flow is controlled simply by setting the optimum camber for the respective existing flight condition, whereby the optimum camber was determined in advance, based on measurements of the flow conditions that were determined as optimal for all possible flight conditions.

With the above method, the values determined in tests on a selected aircraft of a certain type are applied to all other aircraft of the same type. Since the wing air flow reacts very sensitively to changes in the determinative marginal conditions, it often happens that the camber determined by tests for a specific case does not result in the air flow that is actually optimal for this case. This can be caused when, among other things, differences exist between the test aircraft subjected to measurements and the actual aircraft equipped according to this conventional solution. In this context, the differences regard certain parameters that influence the air flow but that are not detectable or ascertainable in the above method. Such parameters are, for example, production-caused deviations of the aircraft geometry or changes in the surface roughness due to aging or contamination, whereby the contamination has an effect particularly in the leading edge areas of the airfoil and of the flaps. Therefore, the accuracy and thus also the effectiveness of the above method is substantially impaired by disturbances that are not readily detectable or ascertainable.

U.S. Pat. No. 4,741,503 discloses a system and a method for adjusting the camber of a wing profile for optimizing the flight performance. Therein, the horizontal speed of the aircraft is measured and the profile camber is varied until the measured speed has reached its maximum value. To carry out this method, a flight computer cooperates with a speed measuring sensor and actuators to activate camber flaps. The instantaneous horizontal speed is measured and a corresponding signal is sent to the flight computer, which in turn, based on a corresponding computer program, outputs signals for controlledly driving the actuators. In this way, the camber of the wing is set so that the horizontal speed achieves its maximum value. With this method, the optimum camber results as a mean value, whereby wing areas with a non-optimum camber continue to exist in addition to wing areas with an optimum camber.

A further system with a flight computer that acts on the flaps of an airfoil via actuators is disclosed in U.S. Pat. No. 5,135,186. In this system for controlling flutter phenomena, the periodic deflections of the airfoil are ascertained by sensors. The corresponding sensor signals are input into the flight computer, which in turn drives the respective actuators in such a way as to suppress the flutter movements. This patent provides no suggestion to reduce the air resistance.

OBJECTS OF THE INVENTION

In view of the above, an object of the invention is to provide a method of the general type mentioned initially above for optimizing the aerodynamic effect of an airfoil, and an apparatus for carrying out the method, such that the flow that was predetermined as optimal for a certain flight condition is actually achieved despite the influence of non-ascertainable disturbance values.

A further object achieved by the invention is to reduce loads from wind gusts and maneuvers, in such a way that excessive loads on the aircraft structure are avoided.

SUMMARY OF THE INVENTION

The above mentioned objects are achieved in a method for optimizing the aerodynamic effect of an airfoil of a transport and commercial aircraft, by ascertaining actual flight data such as altitude, flight speed, and flight weight during flight and carrying out defined changes in the wing camber dependent on these data by carrying out the following steps:

a. determining the air flow caused by the change in camber for the flight condition by ascertaining characteristic values of the air flow using sensors, b. comparing the ascertained characteristic values with corresponding stored nominal reference values for optimum flow for the flight condition, such as pressure distribution, position of points of separation, etc., c. forming differential values between the characteristic values and the stored nominal reference values, d. deriving actuator signals from the differential values, e. changing the camber of the wing by changing the positions of flaps and the like using actuator motors that are driven based on the actuator signals, in such a way as to minimize the differential values, and f. repeating the above steps until the differential values approach zero.

It is of particular advantage that the present method distinctly more accurately maintains the optimum wing air flow in flight as compared to previous solutions. Among other things, it is very advantageous that the position and strength of compression shocks of transonic wings are also effectively controlled, which leads to a reduction in the direct shock-induced separation. Controlling the pressure distribution makes it possible to optimize the boundary layer on the airfoil and thus to minimize the resistance, which in the end results in a distinct reduction in fuel consumption. A further advantage of the method according to the invention is that it can cooperate more effectively via the pressure distribution control with known methods for reducing loads from wind gusts and maneuvers.

An apparatus of the invention serves to carry out the method, wherein the apparatus comprises an airfoil with a flap system formed of a slat system and a trailing edge flap system with high lift flaps and spoilers. The spoilers are respectively biased to lie tightly against the high lift flaps, and corresponding drivable actuator systems are respectively allocated to the flaps of the slat system and of the trailing edge flap system. The apparatus further comprises at least one process computer with at least one memory area for storing actual flight data and parametric wing data. Furthermore, pressure sensors that are connected via digital data lines to the process computer are arranged distributed on the wings. The apparatus further comprises additional pressure sensors that are arranged on the flaps of the trailing edge flap system and that are connected via movable connector leads to the data lines. An input/output unit is logically allocated to each of the actuator systems and the sensors.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
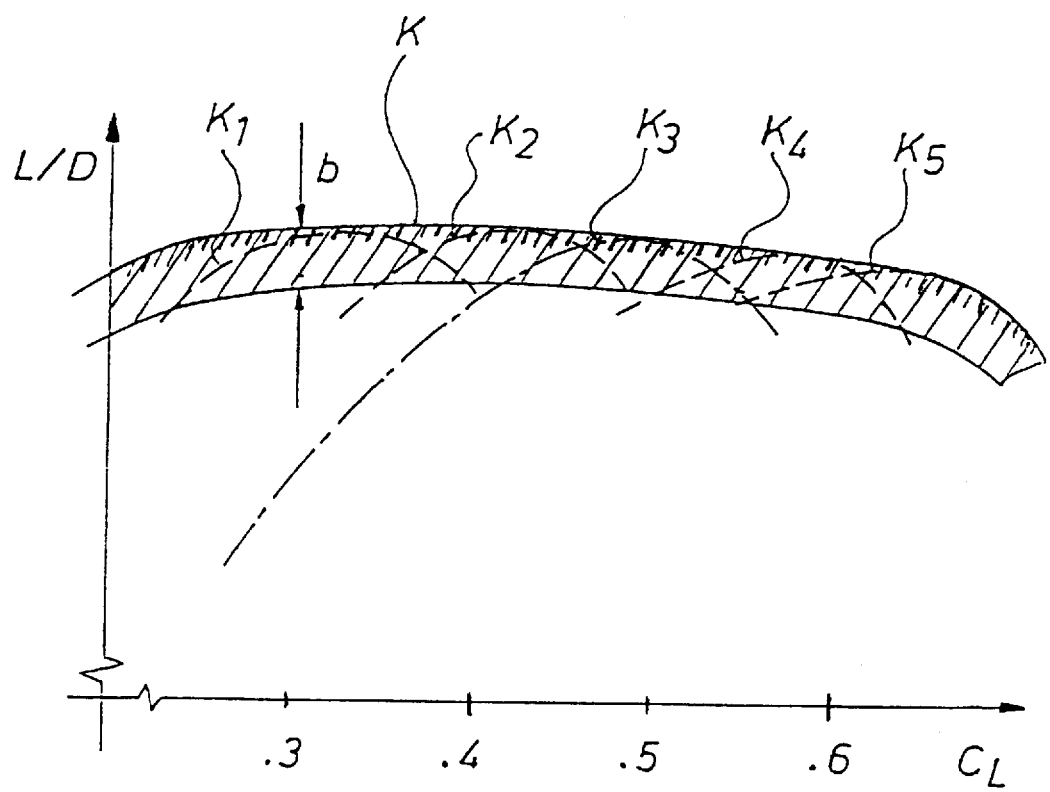
FIG. 1 shows a diagram of the lift/drag ratio according to the state of the art.

FIG. 1 shows a lift/drag ratio diagram according to the state of the art, wherein the lift/drag ratio L/D is plotted versus the coefficient of lift $C_L$. Several curves $k_1$ to $k_5$ are shown, each of which is valid for a certain wing geometry defined by corresponding flap extension angles, whereby in each case optimal conditions exist at the peak of a curve. Based on the conventional method mentioned initially above, by correspondingly driving the relevant flaps, one obtains a new curve K which envelopes the curves $k_1$ to $k_5$. Consequently, nearly optimum lift/drag ratio values are theoretically achievable within the total area of the envelope K. Moreover, the overall system is designed so that all practically occurring wing geometries are included in the envelope K. However, this solution entails inaccuracies insofar as disturbances such as deviations in the aircraft geometry or changes in the surface roughness result in a wing air flow that does not coincide with the one that was determined to be optimal for the flight condition. As a result of this, a differential generally exists between the lift/drag ratio achievable by an optimum air flow and the actually realized lift/drag ratio. This differential is expressed in the diagram of FIG. 1 by a range of uncertainty having a bandwidth b. Since the actually achieved lift/drag ratios almost always lie within the bandwidth b, the optimum values that lie on the upper curve of the envelope K are only very seldom achieved.

Figure 2:
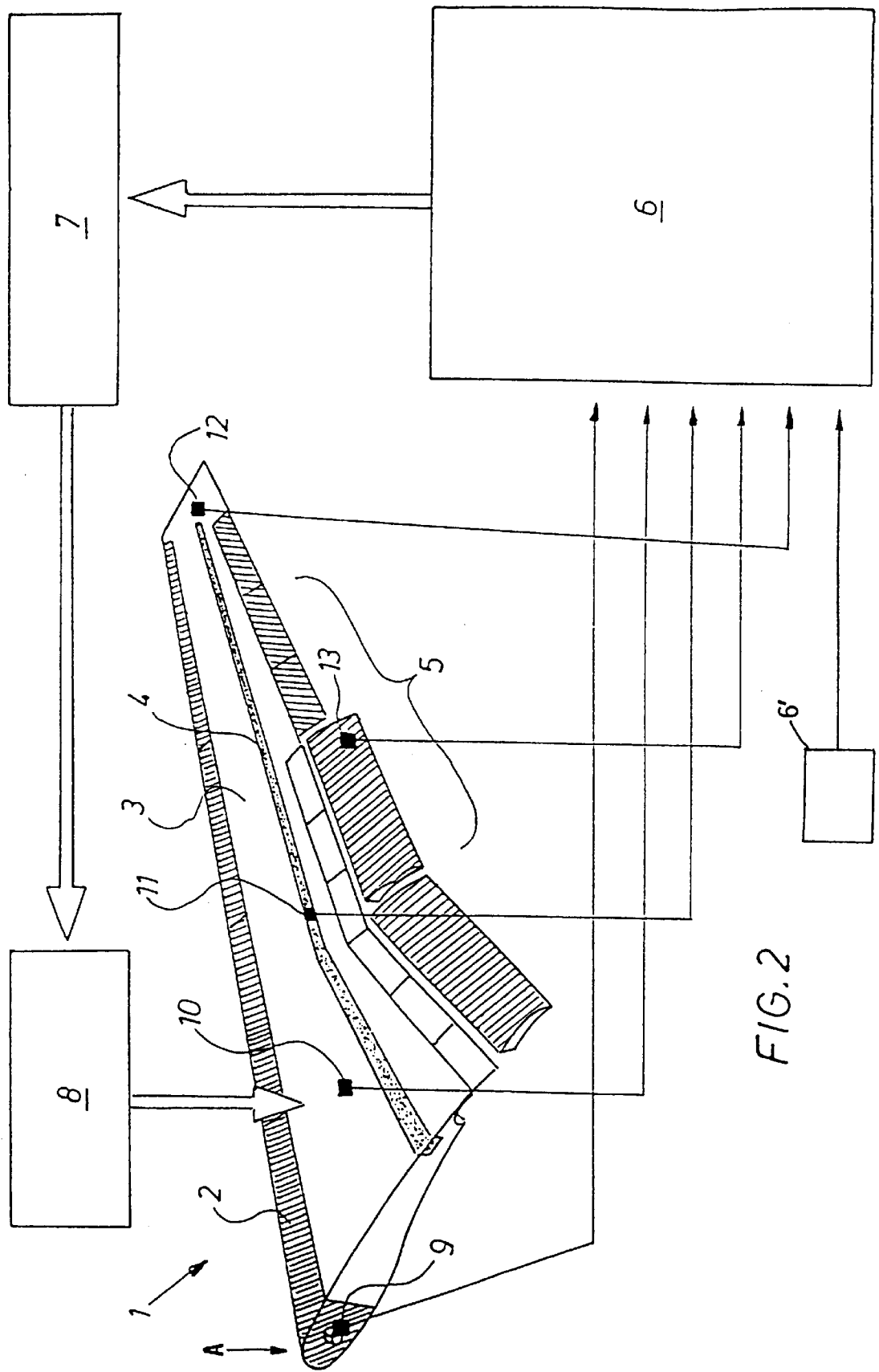
FIG. 2 shows a schematic representation of the apparatus for optimizing the aerodynamics of the airfoil.

FIG. 2 schematically shows an apparatus for optimizing the aerodynamics of a wing of an aircraft A, which in the present example is a right airfoil 1 with a leading edge area 2, a torsion box body area 3, a shock and turbulence area 4, and a trailing edge flap area 5. Several measures are provided for influencing the aerodynamic properties of the wing. Thus, the aerodynamic surfaces and flaps arranged on wing 1 in the leading edge area 2 or trailing edge flap area 5 can be adjusted or set in a known manner so that in each case a certain camber of the wing 1 results. Also, the leading edge area 2 comprises porous surface elements by which a boundary layer can be influenced by suctioning off boundary layer medium. Furthermore, sensors of various types are arranged for ascertaining aerodynamic conditions on the wing 1.

The output signals of the sensors are fed to a data acquisition computer 6, where the measured data are preprocessed so that they can then serve as input values for the process computer 7. The process computer 7 forms corresponding control signals for the actuator systems 8 that are arranged within wing 1 and that actuate the camber-adjusting aerodynamic means such as flaps or slats of the wing. The process computer 7 generates the control signals based on the measured data it receives from the data acquisition computer 6 and based on the nominal reference values for optimum flow for the flight condition that are stored in the memory area of the process computer 7. This initially causes a camber to be set that has been determined to be optimal for the instantaneously prevailing flight condition.

The data acquisition computer 6 is connected with a data source 6' that continuously provides the actual data relating to the instantaneous momentary flight condition such as speed, weight, and altitude. This data source, for example, can be the flight computer that is typically already present in the aircraft. It is also conceivable that the process computer 7 receives the actual speed and altitude values directly from the corresponding sensors and that it itself determines the flight weight based on fuel consumption. The sensor system connected to the data acquisition computer 6 comprises in detail a through-flow sensor 9, a sensor system 10 for boundary layer control, a sensor system 11 for shock control, a load sensor system 12, and a general pressure sensor system 13.

Based on the apparatus described above, it becomes possible to carry out a method for optimizing the aerodynamic effect of an airfoil by automatically matching the camber of the airfoil to the respective prevailing flight condition, while maintaining the maximum possible lift/drag ratio based on stored data and by taking into consideration the actual flight data, namely altitude, weight, and speed. More particularly, the following functions or steps are carried out:

determining the actual flight condition by means of the data acquisition computer 6 by reading-in flight data such as altitude, Mach number, and flight weight, determining the camber of the wing that is required in view of the lift/drag ratio by means of the process computer 7, based on stored data, and setting the determined camber, determining the pressure distribution on the wing and comparing, by means of the process computer 7, the measured data with stored data for the optimum pressure distribution, and accordingly adjusting the camber of the wing to achieve the optimum pressure distribution, ascertaining the boundary layer and particularly the points of separation of the boundary layer on the wing via sensors S, and comparing, by means of the process computer 7, the characteristic values with stored data for the optimum position of the points of separation, and stabilizing the separation at the optimum position by suctioning off boundary layer medium as needed and by accordingly adjusting the camber.

In the case of a transonic wing, the following function or step is also carried out:

determining the position and strength of compression shocks on the wing and comparing, by means of the process computer 7, the measured data with stored data for the optimum shock configuration, and producing this optimum shock configuration by accordingly adjusting the camber.

The nominal reference values for the air flow used within the context of the present method are pre-specified in a fixed manner for each respective flight condition or are determined during flight on the basis of the measured data, which are then generated at the level of the comparison data.

The load sensor system 12 is not required for optimizing the air flow, but in combination with the other elements of the apparatus it allows a very effective load reduction in an advantageous manner as will be described below.

Figure 3:
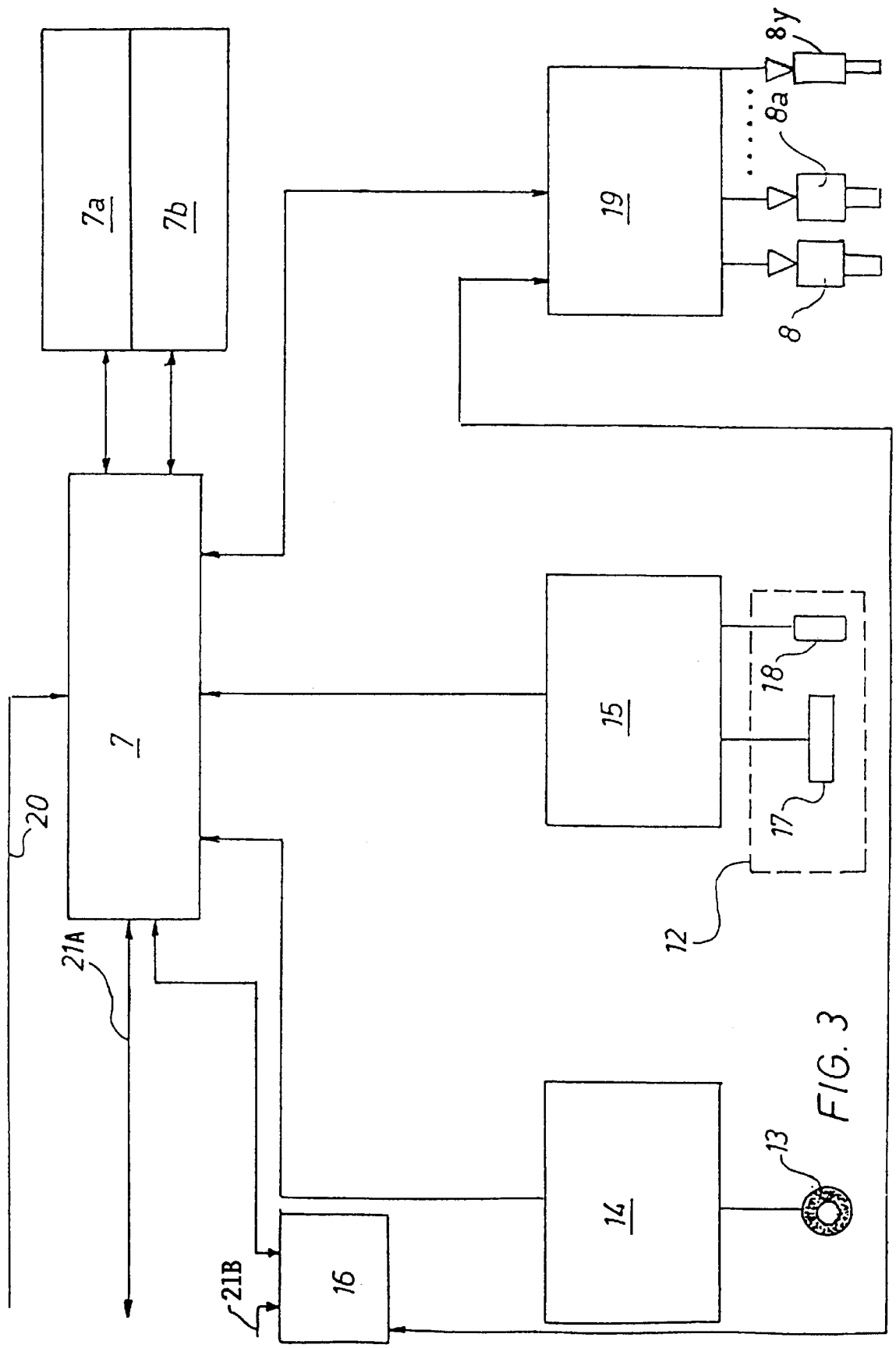
FIG. 3 shows a block circuit diagram of the apparatus according to FIG. 2.

FIG. 3 shows the process computer 7 with the memory areas 7a and 7b wherein the parametric aerodynamic wing data or the parametric dynamic wing loads and moments, respectively, are stored. The process computer 7 allocated to the right airfoil 1 according to FIG. 2 is shown here in conjunction with the other functional units, some of which have already been mentioned. Thus, process computer 7 is connected via a pressure sensor network 14 with the schematically represented pressure sensor system 13. The process computer 7 is also connected via a load sensor network 15 with a load sensor system 12, consisting of accelerometers 17 and load sensors 18. A fail-safe computer 16 is connected to the process computer 7 as well as to a motor system network 19, which in turn is connected to the process computer 7 and the actuator systems 8 to 8y. The actuator systems 8 to 8m serve to actuate the flaps in the leading edge area 2 and the actuator systems 8n to 8y serve to actuate the flaps in the trailing edge flap area (also see FIG. 6). The process computer 7 is connected to the primary and secondary control system via line 20. A cross connection 21A and 21B connects the process computer 7 and the fail-safe computer 16 with the corresponding processors for the left wing, which is not shown here.

The construction of the fail-safe computer 16 corresponds to that of the process computer 7. Computer 16 does not play an active role in normal operation, but receives all input data that the process computer 7 receives, so that it is prepared at all times to take over all the functions of the process computer 7, should it fail. Switching over from the process computer 7 to the fail-safe computer 16 is carried out by a corresponding error recognition logic circuit, which continuously monitors the function of process computer 7, and triggers the change-over as required.

Figure 4:
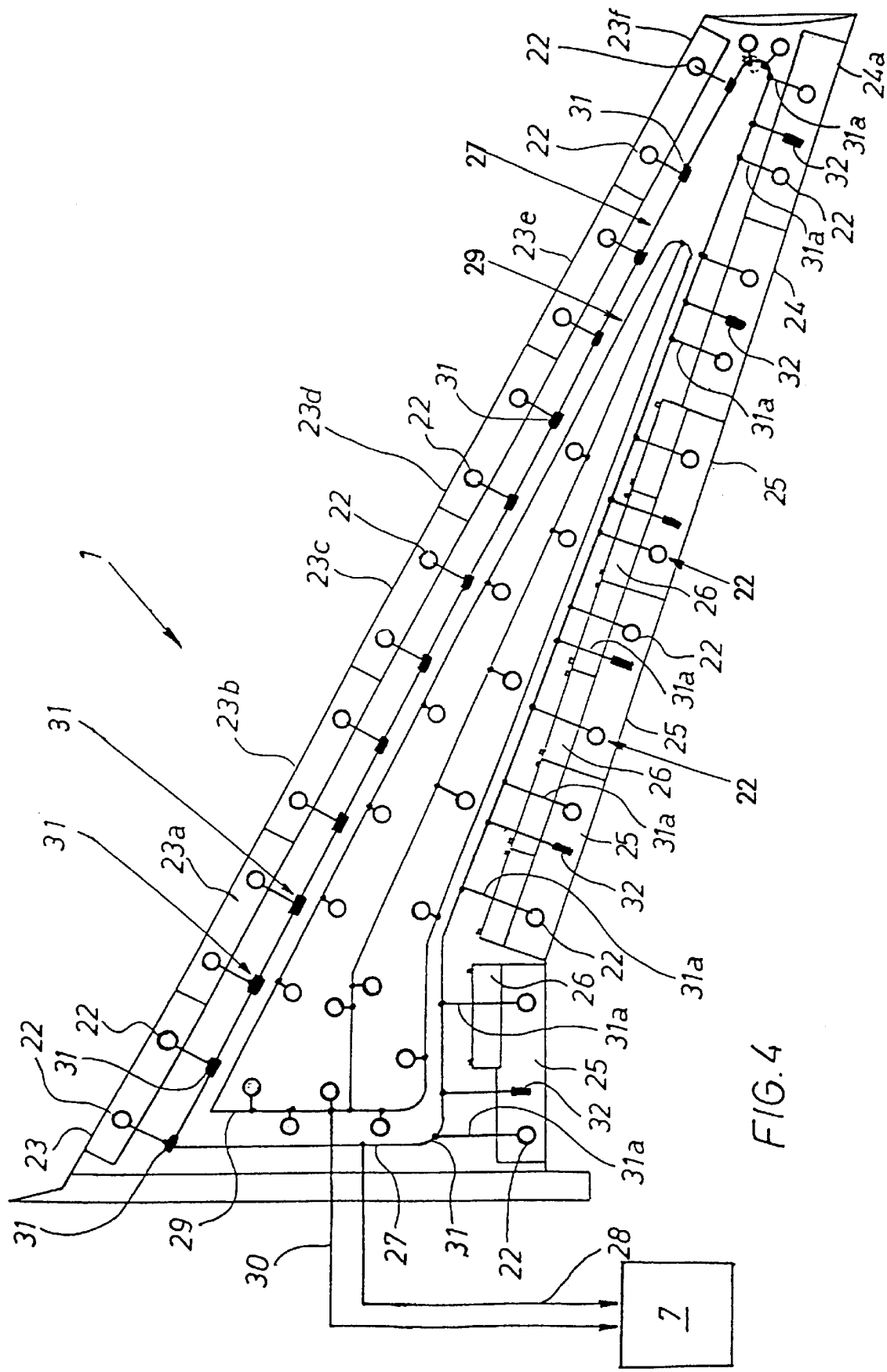
FIG. 4 shows a top view of an airfoil with information paths or data lines or buses and sensors.

The distribution of the pressure sensors 22 on the wing 1 is basically explained in connection with FIG. 4. The wing comprises the typical devices for controlling lift, namely leading edge flaps 23, ailerons 24 and 24a, high lift flaps in the form of landing flaps 25, and spoilers 26. The spoilers 26 are biased to lie tightly against the high lift flaps. In addition to the effect of adjusting the camber of the wing, movement of these devices achieves an advantageous change in the curvature of the wing profile in the spoiler area. The pressure sensors 22 are arranged at certain locations where it is necessary to ascertain the pressure values. Thus, certain pressure sensors 22 are arranged in the area of the leading edge flaps 23, the ailerons 24, and the landing flaps 25.

All of these pressure sensors 22 are connected to a ring-form data bus 27, which itself is connected via a data line 28 to the process computer 7. The pressure sensors 22 located in the area of the wing torsion box body are connected to a further ring-form data bus 29, which is connected to the process computer 7 via a corresponding data line 30. The data buses and data lines shown here are embodied as light beam wave guides. The individual pressure sensors 22 are connected to the corresponding data bus 27, 29 via respective T-couplers 31. The optical signals are transmitted between the data bus 27 and the pressure sensors 22 on the flaps, respectively via flexible or movable connecting leads 31a. These leads are, in a simple embodiment, light beam wave guides that have been provided with a sufficiently flexible sheath.

In addition to the pressure sensors 22, the airfoil 1 comprises bending sensors 32, which are also connected via flexible or movable connecting leads 31a to the data bus 27. These bending sensors 32 are arranged on the trailing edges of the ailerons 24 and of the landing flaps 25. The mechanical load resulting from the aerodynamic forces acting on the corresponding flaps is ascertained by the sensors 32. At least one processor unit with an analog-digital converter, a power supply unit, and an input/output unit, in addition to the opto-electronic couplers, is respectively allocated to all of the sensors 22 and 32. Thus, each sensor 22, 32 is digitally addressable so that it can output its measured values in response to a specific targeted data query from the process computer 7. Coupling links of variable length, which are described below, can also be used in place of the flexible connecting leads 31a. The bending sensors 32 can be of any known type. Thus, for example, it is conceivable that the bending sensors can be realized as foil strain gauges which convert a strain of the material surrounding them to a change in electrical resistance.

The above mentioned bending sensors 32 can also be realized by optical means. For example, a measuring device according to German Patent Document 3,903,881 C1 for ascertaining small distances can be used. In this case, optical fibers of various lengths are embedded in a carrier that is deflectable perpendicularly to its longitudinal axis. The deflections, produced by bending for example, can be ascertained and evaluated by an electronic circuit. It is advantageous here that such a measuring device can be easily integrated into a system which already comprises fiber optic components.

Figure 5:
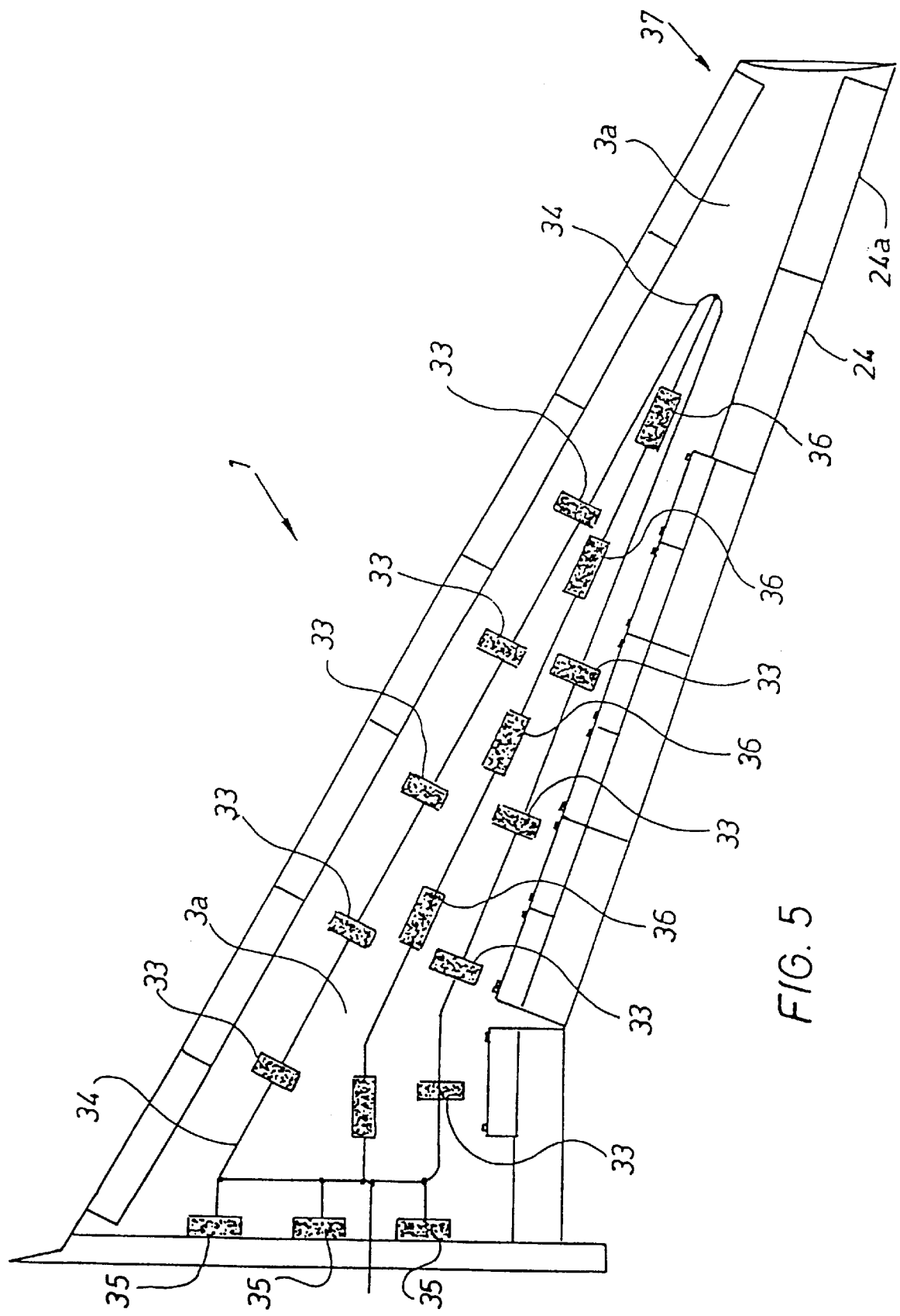
FIG. 5 shows a top view of the airfoil according to FIG. 4 with load sensors.

FIG. 5 shows an overview of the load sensors 33 that are arranged on wing 1 in the area of the wing torsion box body and are connected to a ring-form bi-directional data bus 34. Additional load sensors 35 are arranged in the wing root area and are connected to the data bus 34. Moreover, accelerometers 36 which, like the load sensors 35, are arranged in selected areas of the wing torsion box 3a, are also connected to the data bus 34. The signals provided by the load sensors 33, 35 and the accelerometers 36 are used in combination with the means described above to carry out the load-reducing functions of the apparatus. For this purpose it is necessary that the apparatus reacts very quickly to disturbance forces that act upon the wing. For example, if a down gust influences the wing tip 37, which is determined by the load sensors 33, 35 and the accelerometers 36, then the process computer 7 described above instantaneously actuates a precisely dosed downward deflection of the ailerons 24 and 24a. The introduction of a possibly inadmissibly high bending moment into the airfoil 1 is thereby avoided. Since the corresponding computer operations are processed in real-time, whereby large volumes of data must be processed in a very short time, very high demands are placed on the performance capability of the participating computers. Therefore, an embodiment of the invention provides that at least the process computer 7 is constructed as a multi-processor circuit.

Figure 6:
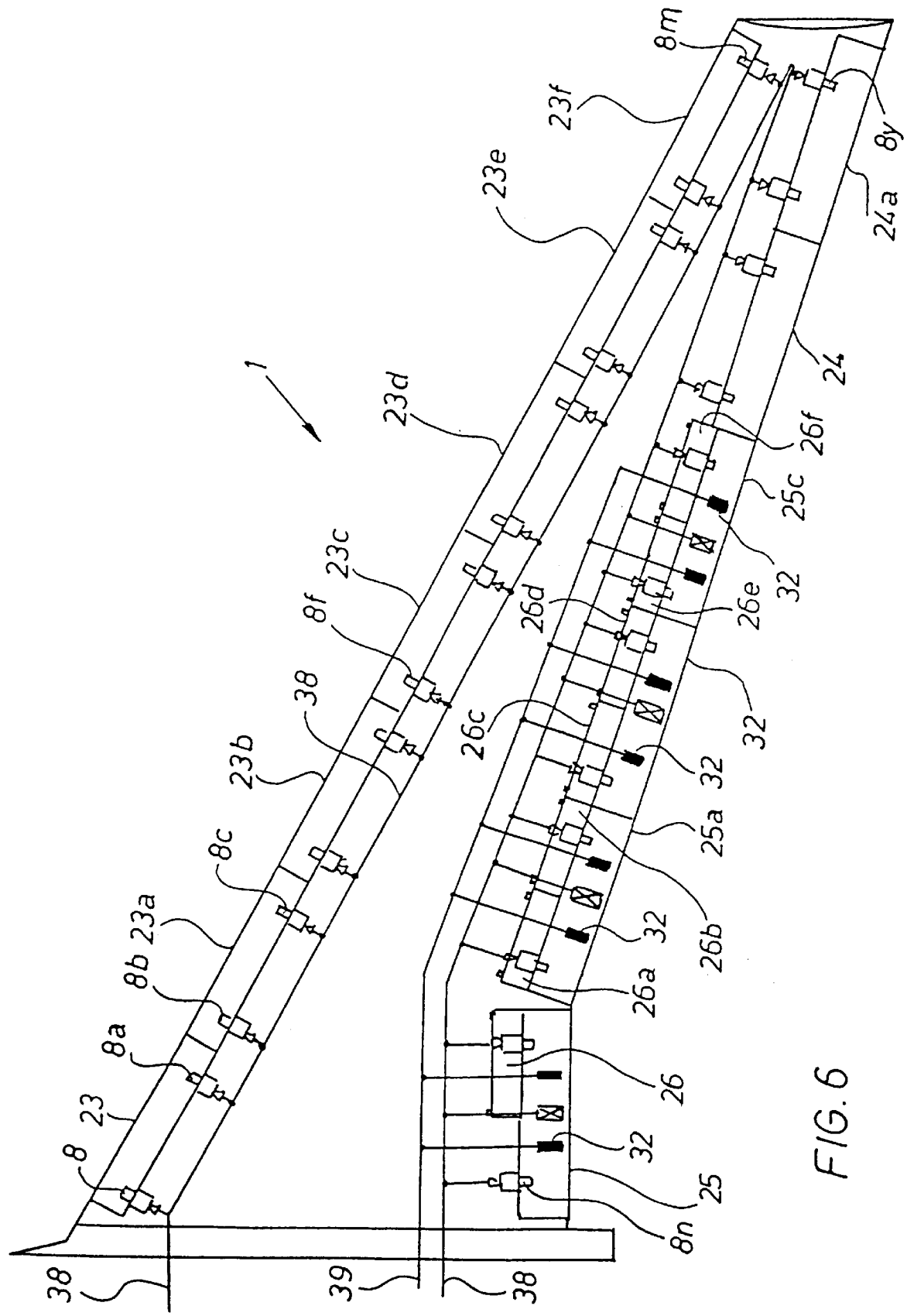
FIG. 6 shows a top view of an airfoil according to FIG. 5 with actuators.

FIG. 6 shows an overview of the actuator systems allocated to the individual control elements on the wing 1. The control elements comprise the leading edge flaps 23 to 23f on the leading edge of the wing, to which the actuator systems 8 to 8m are allocated. The trailing edge flap system comprises the landing flaps 25 to 25c, the spoilers 26 to 26f, and the ailerons 24 and 24a, to which the actuator systems 8n to 8y are allocated, respectively. Therein, each individual control element is actuated by two actuator systems 8. A data bus 38 is arranged in the leading edge area and the trailing edge area of the wing 1 for connecting the actuator systems 8 to 8y to the process computer 7, which is not shown here. The data exchange with the bending sensors 32 takes place via a data bus 39.

Figure 7:
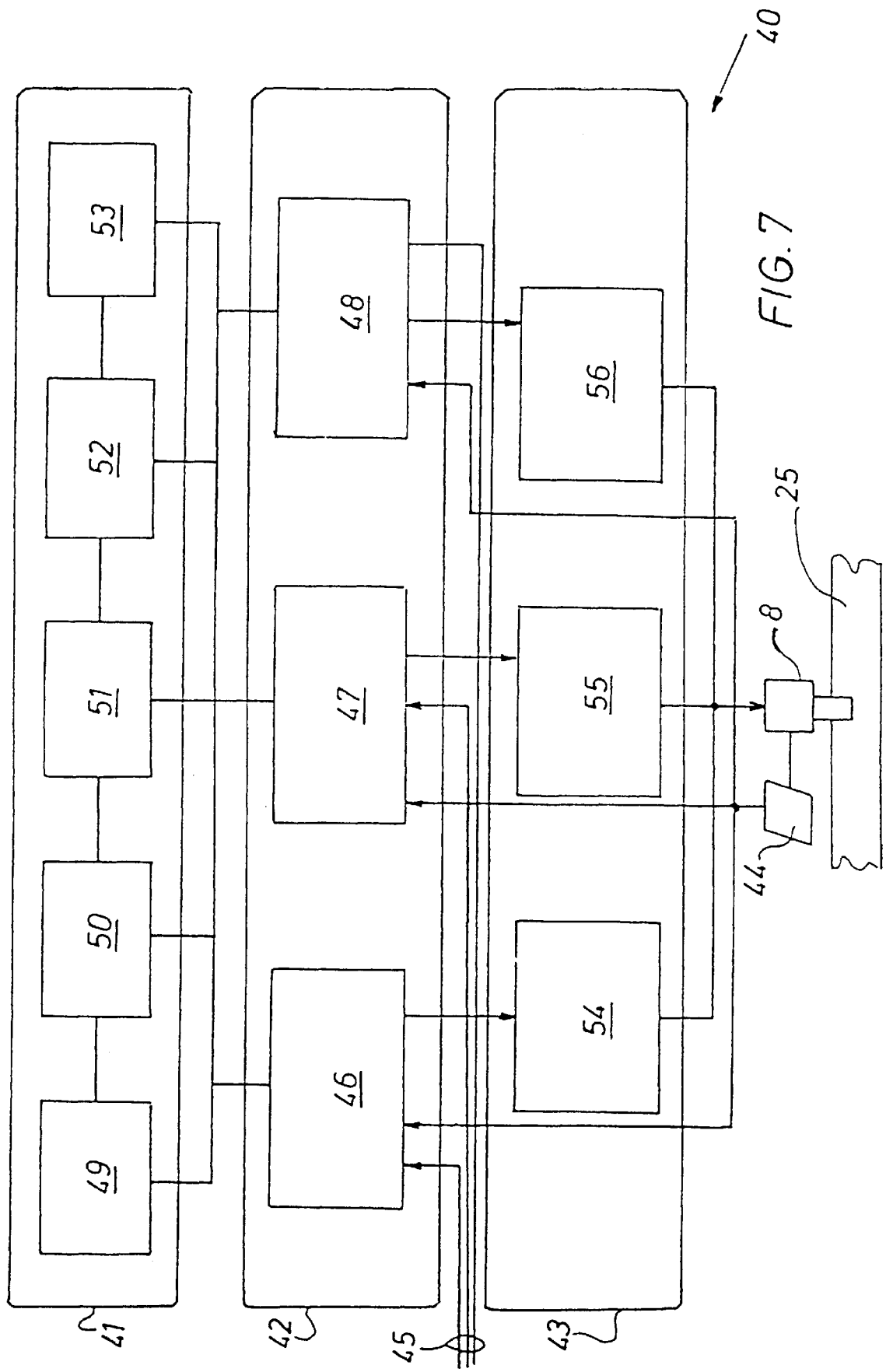
FIG. 7 shows a block circuit diagram of an actuator electronics circuit.

FIG. 7 shows an actuator electronics circuit 40 with its functional units, as it is logically allocated to each actuator system. The actuator electronics circuit 40 comprises three levels that are connected to each other, namely a test level 41, a processor level 42, and a logic channel level 43. The actuator system 8, together with a position indicator 44 that cooperates therewith, are connected to the actuator electronics circuit 40. The actuator electronic circuit 40 is connected via data lines 45 to the data bus 38, which is not shown here.

To increase reliability, the processor level 42 comprises three signal processors 46, 47, 48 working in parallel operation. Within the test level 41 there are five master voter processors 49 to 53 that are connected via an intermeshed system of data lines to the signal processors 46, 47, 48. The voter processors 49 to 53 continuously monitor the function of the signal processors 46, 47, 48, based on their input and output values. If the voter processors 49 to 53 determine a failure of one of the signal processors 46, 47, 48, then the failing processor is automatically switched off and a corresponding error message is simultaneously stored in a maintenance plan. Channel level 43 contains three logic channels 54, 55, 56 that transmit the control signals coming from the signal processors 46, 47, 48 to the actuator system 8, which then serves to actuate landing flap 25, for example.

Two actuator systems 8 act on each landing flap 25. A respective actuator electronics circuit 40 is allocated to each of the actuator systems 8. In the same manner, two actuator systems 8, each with an actuator electronics circuit 40, are also respectively provided for the leading edge flaps 23, the spoilers 26, and the ailerons 24. In each case the two actuator systems respectively allocated to one flap or aileron are commonly addressable together, so that they execute the actuation of the flap or the aileron to the precise angle based on a corresponding positioning command sent from process computer 7. By means of the position indicators 44, the process computer 7 can interrogate or call up the instantaneously existing angular position of the individual control elements and thereby ascertain the actual values of the flap positions in order to compare them with the stored nominal reference values and, if necessary, correct them. Definite profile cambers can thus be set in the individual sections of the wing, based on the corresponding commands being sent from the process computer 7.

Figure 8:
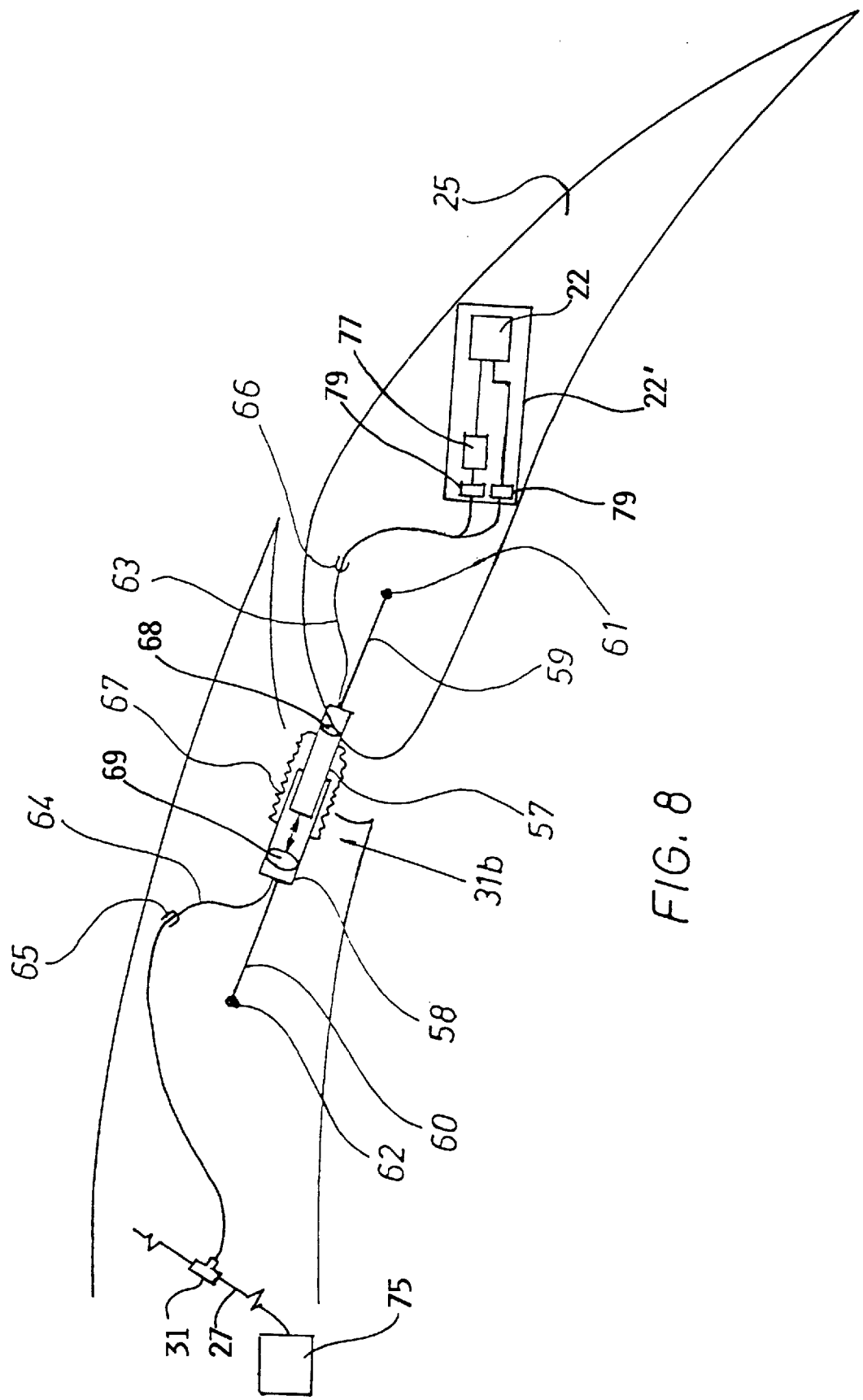
FIG. 8 shows an optical coupling link.

FIG. 8 shows a schematic broken open side section of a coupling link 31b of variable length for transmitting light signals to and from a movably arranged element, for example, the landing flap 25. The coupling link 31b comprises in detail an inner cylinder 57 and an outer cylinder 58, whereby the inner cylinder 57 is telescopically slidable in the outer cylinder, with little play. The opposite ends of both cylinders 57, 58 are closed and respectively provided with a coaxially attached rod 59 and 60. The free end of each rod 59, 60 comprises a connector point 61, or 62 for forming a joint fixed to the wing or flap, respectively. Furthermore, the coupling link comprises two light beam wave guides 63, 64, of which one end respectively enters coaxially into the hollow space formed by the cylinders 57, 58 and of which the other end respectively comprises a coupling element 66, 65 for connecting to a light beam wave guide laid out on the side of the wing 1 or the landing flap 25. As a consequence of this arrangement, the cylinder-side ends of the light beam wave guides 63 and 64 lie in alignment opposite one another within the cylinders 57, 58. Thus, a light signal coming in on the light beam wave guide 63, for example, exits at the cylinder end of the guide, passes through the inner space within the cylinders 57, 58 and enters the opposite facing end of the light beam wave guide 64.

With this optical coupling link 31b, a sensor 22 arranged on a landing flap 25 or another control surface can now be connected to a data bus 27 laid out within the airfoil 1 and therewith connected to the process computer 7. If the landing flap 25 executes a motion relative to the wing torsion box, then the coupling link 31b forms a linear connection at all times between connecting point 62 on the wing side and connecting point 61 on the landing flap side, so that an optical contact occurs across the coupling link 31b. It is advantageous hereby that the end surfaces of the light beam wave guides 63, 64 at the cylinder end are sealed against contamination by; the cylinders 57, 58, so that the same transmission characteristics for the digital optical signals exist at all times. An improved seal against contamination is achieved by covering the movement gap that exists between the cylinders 57 and 58 with a bellows boot 67.

Not only digital signals can be transmitted via the coupling links 31b. Namely, in one embodiment of the invention it is provided that the coupling links 31b are also utilized for supplying power to the sensors. For this purpose, powerful light sources 75 generate correspondingly high-energy light that is guided across the coupling links 31b into the sensor electronics 22' where it is converted into electrical energy by at least one photovoltaic cell 77 to supply power to the sensor electronics. In this case, by using suitable optical filters 79 it is ensured that the digital light signal traffic is not disturbed by the energy or power radiation. By optically supplying energy to the sensor electronics via the coupling links 31b, flexible electrical cables become unnecessary, for example, from the wing torsion box to the landing flaps 25.

In a further embodiment of the invention, a lens 68 or 69 is optically allocated to each end surface of the light beam wave guides 63, 64 to collect or diffuse the light, respectively. Thus, possible angular deviations of the ends of the light beam wave guides have a non-critical effect on the transmission characteristics of the coupling link 31b.

Figure 9:
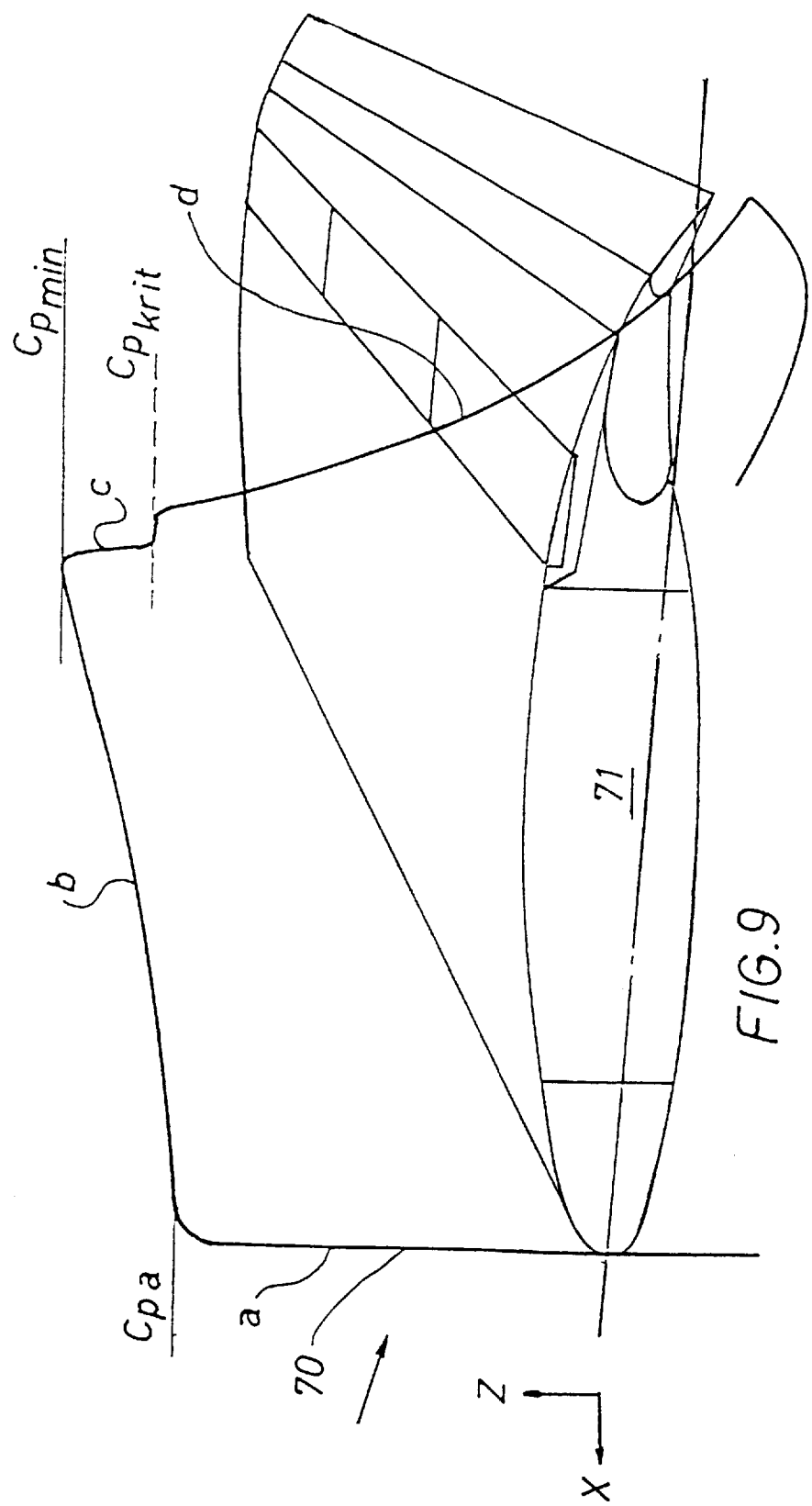
FIG. 9 shows a wing section with a $c_p$ diagram.

FIG. 9 shows a $C_p$ diagram with the corresponding wing section for a certain flight condition, for example for cruise flight at a certain altitude and at a certain speed. The pressure distribution shown here according to the curve 70 applies to the plane of the section 71 and is measured during flight by the pressure sensors arranged according to the invention. Curve 70 comprises a leading edge area a, a laminar area b, a shock area c, and a turbulence area d. Curve 70 coincides precisely with the curve that was determined in the preceding tests to be optimal for the flight condition on the wing section 71 that is shown. Curve 70 distinguishes itself by a steep pressure drop along the leading edge area a of the curve down to an initial value $C_{p\,a}$ and a gradual, continuing pressure drop along the laminar area b of the curve down to a value $C_{p\,min}$. Furthermore, it is characteristic for the optimum pressure distribution that the pressure in the shock area c increases only to a value $c_{p\,krit}$ in a relatively weak compression shock, which is a precondition for minimizing shock-induced separation. In the turbulence area d, finally, a controlled increase in pressure occurs up to the wing trailing edge, which satisfies a further precondition for minimizing the shock-induced separation.

A substantial advantage of the apparatus described above is that it can be used in varying forms with an already existing digital flight control system. Thus, it is conceivable that the apparatus will be incorporated in an aircraft in the form of add-on devices. It is also conceivable that the individual units of the apparatus will exist as components of a further developed flight control system installed in an aircraft. In any case, the functions of the automatic wing optimization are carried out in addition to the functions of the relevant flight control system, so that a failure of the apparatus has no effect on the primary flight control system.

Although the invention has been described with reference to specific example embodiments, it will be appreciated that it is intended to cover all modifications and equivalents within the scope of the appended claims.

We claim:

1. A method of optimizing an aerodynamic effect of an airfoil of an aircraft, wherein said airfoil has an adjustable camber that can be adjusted by actuating a camber motor system, wherein said method comprises:

a) measuring with sensors a pressure distribution on said airfoil to provide a plurality of measured pressure values;

b) comparing said measured pressure values with corresponding stored optimal pressure reference values;

c) forming differential values between said measured pressure values and said stored optimal pressure reference values;

d) actuating said camber motor system to adjust said camber; and e) repeating said steps a) to d) until said differential values are approximately or exactly zero.

2. The method of claim 1, further comprising, before said step a), a preliminary step of determining and storing said pressure reference values for an optimal pressure distribution for a given flight condition of said aircraft.

3. The method of claim 1, wherein said step a) comprises measuring said pressure distribution at a plurality of locations on each of a plurality of camber sections along said airfoil to provide said plurality of measured pressure values.

4. The method of claim 3, wherein said camber of said airfoil can be adjusted independently at each of said plurality of camber sections, and said steps b) to e) are carried out independently for each of said plurality of camber sections.

5. The method of claim 1, wherein said stored optimal pressure reference values define an optimal pressure distribution for said airfoil in a particular flight condition of said aircraft that exists when said step a) is carried out.

6. The method of claim 1, wherein said step a) includes sensing a position of a compression shock on said airfoil to provide actual shock position data, and said step b) includes comparing said actual shock position data with corresponding stored optimal shock position data.

7. The method of claim further comprising, before said step a), a first preliminary step of determining an actual flight condition of said aircraft by inputting actual flight data including at least one of a flight altitude, a flight velocity and a flight weight into a data acquisition computer, a second preliminary step of using a process computer to determine a nominal camber of said airfoil for an optimum lift/drag ratio based on stored nominal camber data, and a third preliminary step of actuating said camber motor system to adjust said camber of said airfoil to said nominal camber, and wherein said steps b) and c) are carried out by said process computer, said steps d) and e) are carried out so that said measured pressure distribution is made to correspond substantially with an optimal pressure distribution defined by said stored optimal pressure reference values, said step a) includes determining actual position values of points of separation of a boundary layer from said airfoil based on said measured pressure values, said step b) includes comparing said actual position values of said points of separation with corresponding stored reference data for an optimal position of said points of separation, and said steps d) and e) are carried out so that said actual position values of said points of separation are made to correspond with said optimal position of said points of separation.

8. The method of claim 7, wherein said airfoil is a transonic airfoil, said method further comprises measuring a position of a compression shock on said airfoil to provide measured shock position data and comparing said measured shock position data with corresponding stored optimal shock position data, and said steps d) and e) are carried out so that said measured shock position is made to correspond with an optimal shock configuration defined by said stored optimal shock position data.

* * * * *